(12) United States Patent
Branning et al.

(10) Patent No.: US 7,651,133 B2
(45) Date of Patent: Jan. 26, 2010

(54) FRAME EXTENDER (75) Inventors: Isaac D. Branning, Arcola, IN (US); Steve O. Miller, Decatur, IN (US); Paul N. Sorvari, Fort Wayne, IN (US); Michael W. Johnston, Alexander City, AL (US); Xiao-Ming Li, Canton, MI (US); Bryce Richards, Royal Oak, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 387 days.

(21) Appl. No.: 11/741,958

(22) Filed: Apr. 30, 2007

(65) Prior Publication Data
US 2008/0265602 A1 Oct. 30, 2008

(51) Int. Cl.
*B62D 21/14* (2006.01)
(52) U.S. Cl. .................. 280/785; 280/781; 280/727
(58) Field of Classification Search .............. 280/785, 280/781, 727, 787, 762, 124.109; 180/311, 180/312; 296/187.01, 203.01, 204, 26.08
See application file for complete search history.

(56) References Cited

U.S. PATENT DOCUMENTS

| 4,634,168 | A  | * | 1/1987 | Fuchs et al. ................ 296/35.1 |
| 5,031,958 | A  | * | 7/1991 | Fujita et al. ............ 296/203.02 |
| 7,210,706 | B1 | * | 5/2007 | Auston, Jr .................. 280/781 |
| 7,261,322 | B2 | * | 8/2007 | Ito et al. ..................... 280/781 |
| 2005/0134015 | A1 | * | 6/2005 | Ziech et al. ........... 280/124.109 |

OTHER PUBLICATIONS

International Truck and Engine Coporation; "Bumper, Front," Part No. R01-54419; Reference No. R9J0000-001.

* cited by examiner

*Primary Examiner*—Paul N Dickson
*Assistant Examiner*—Drew Brown
(74) *Attorney, Agent, or Firm*—Jeffrey P. Calfa; Mark C. Bach (57) ABSTRACT

A frame extender (10) for attachment to a siderail (14) and to a front cross member (16A) of a vehicle frame (12) having a centerline (C) includes a first portion (52) generally parallel with and attached to the siderail. The frame extender (10) also includes a second portion (66) extending generally transversely from the first portion (52) and outwardly from the centerline (C), and a third portion (80) extending from the second portion and generally parallel to the siderail (14). The first portion (52), the second portion (66) and the third portion (80) are formed as a single component.

18 Claims, 8 Drawing Sheets

FRAME EXTENDER

FIELD OF THE INVENTION

The present invention relates generally to automotive vehicles, and more particularly, to a frame extender for mounting components to a vehicle frame.

BACKGROUND OF THE INVENTION

Typically, automotive vehicles include a frame, also referred to as a chassis, which provides the primary structural support for the vehicle. A typical full perimeter frame includes, among other components, two longitudinally extending frame siderails. The siderails are commonly connected to one another by several latitudinal cross members.

The major components of the vehicle, such as the engine and radiator are mounted to the frame. In some cases, the frame is provided with a frame extender to lengthen and/or widen the frame. As is known, the frame may need to be extended to accommodate vehicle components that would otherwise not be accommodated by the conventional frame alone. In this situation, a vehicle component is mounted to the frame extender instead of being mounted directly to the frame.

Several considerations are particularly important in designing the frame extender. First, the vehicle components need to be positioned accurately in relation to the frame and the other vehicle components in order to maximize the operating life of the vehicle's drive system. In addition, the frame extender should be simple and fast to assemble to the frame so that labor costs to manufacture the vehicle can be minimized.

A frame extender that allows vehicle components to be quickly secured to the frame are especially important in modern manufacturing processes. In the typical manufacturing process, the major components of the vehicle are subassembled away from each other at different locations. Commonly, the manufacturer of the vehicle will purchase each of the major components from different suppliers. The manufacturer then mounts each of the components to the vehicle frame at a primary vehicle assembly line that is usually precisely designed to maximize the quantity of the vehicles that can be produced and the speed of their production. Thus, the assembly line is designed to move quickly through a number of successive assembly stations.

Current frame extenders are not well-suited for the speed required in these modern manufacturing processes. The conventional frame extenders have multiple, discrete parts, typically three parts. In the conventional frame extender, each part has to be attached to each other and to the frame. This assembly procedure is time-consuming. Further, with the additional frame extender components added to the frame, it is more difficult to accurately position the vehicle components in relation to the frame and the other vehicle components, which can reduce the operating life of the engine and other vehicle components.

SUMMARY OF THE INVENTION

A frame extender for attachment to a siderail and to a front cross member of a vehicle frame having a centerline includes a first portion generally parallel with and attached to the siderail. The frame extender also includes a second portion extending generally transversely from the first portion and outwardly from the centerline, and a third portion extending from the second portion and generally parallel to the siderail. The first portion, the second portion and the third portion are formed as a single component.

DESCRIPTION OF A PREFERRED EMBODIMENT

Figure 1:
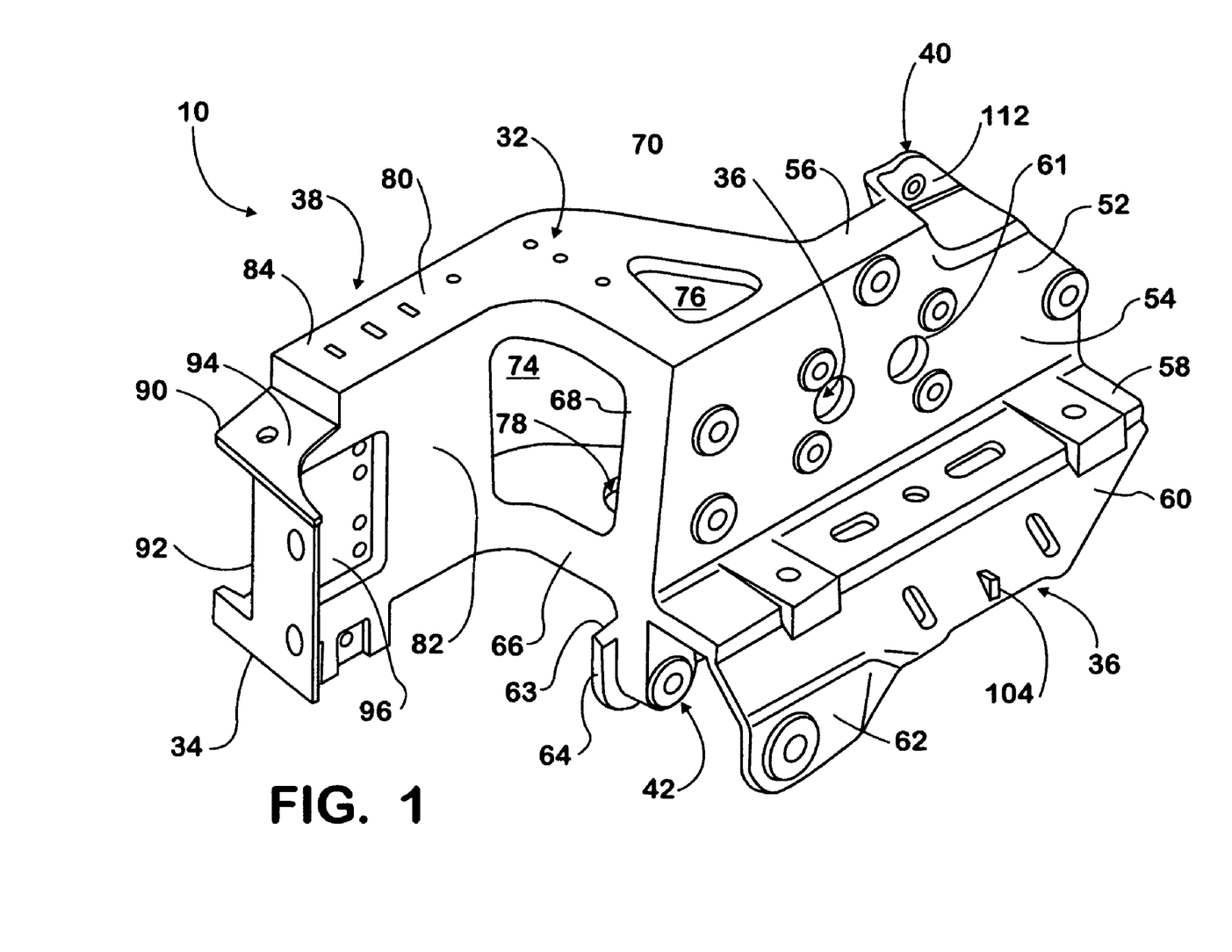
FIG. 1 is a front perspective view of a frame extender in accordance with the invention.
Figure 2:
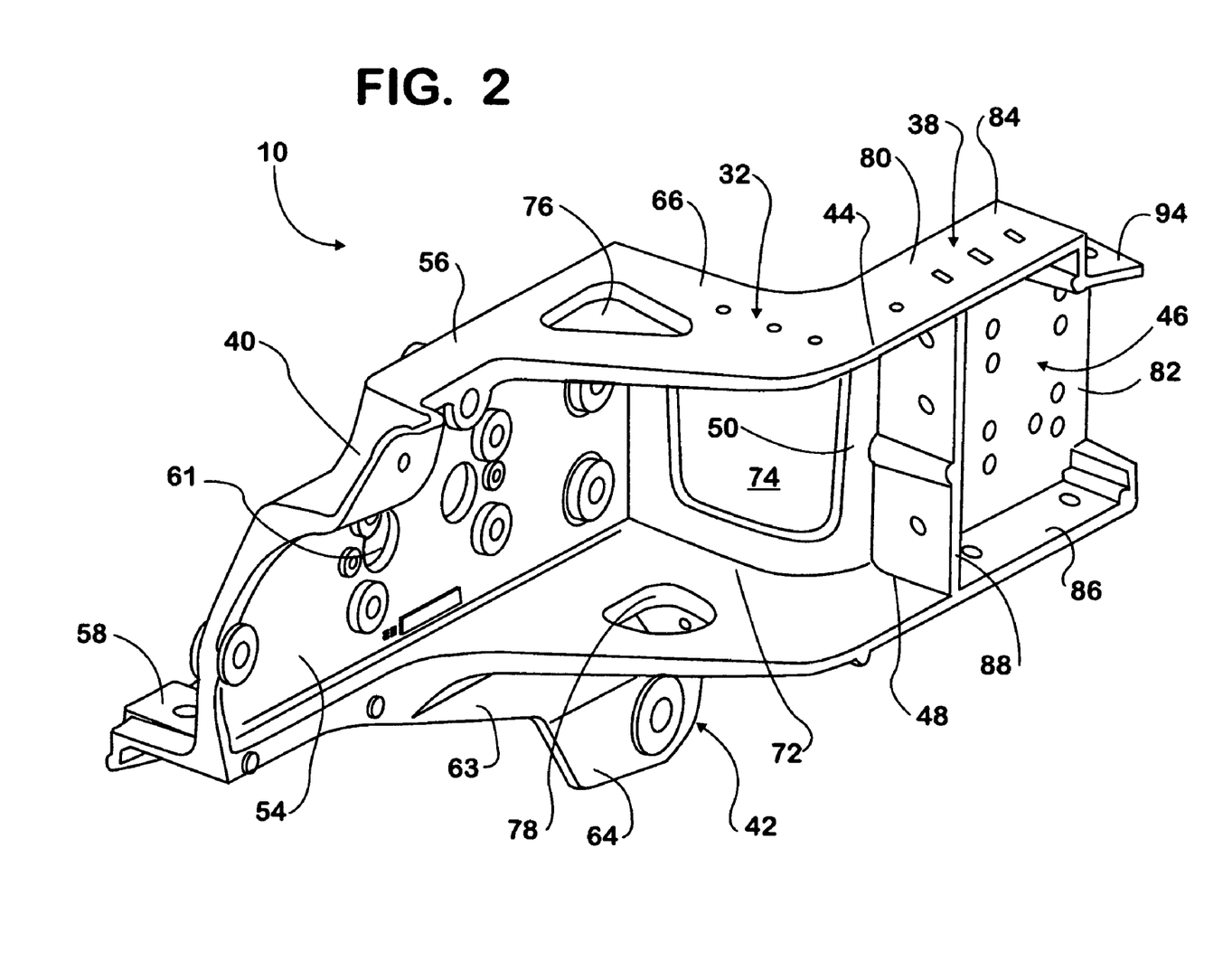
FIG. 2 is a rear perspective view of the frame extender in accordance with the invention.
Figure 3:
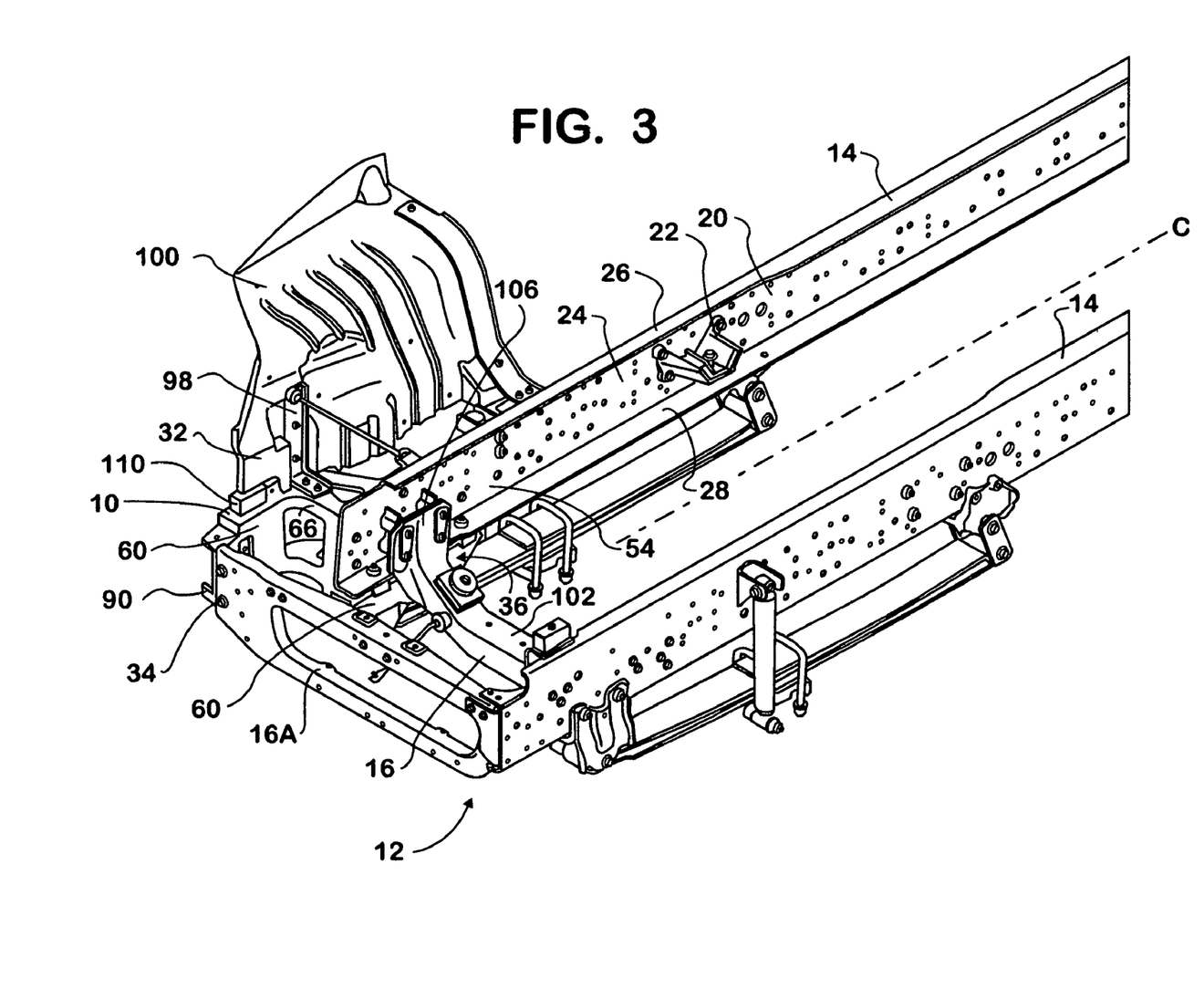
FIG. 3 is a front perspective view of the frame extender attached to a frame and a front cross member, the frame extender having vehicle components attached thereto, in accordance with the invention.
Figure 4:
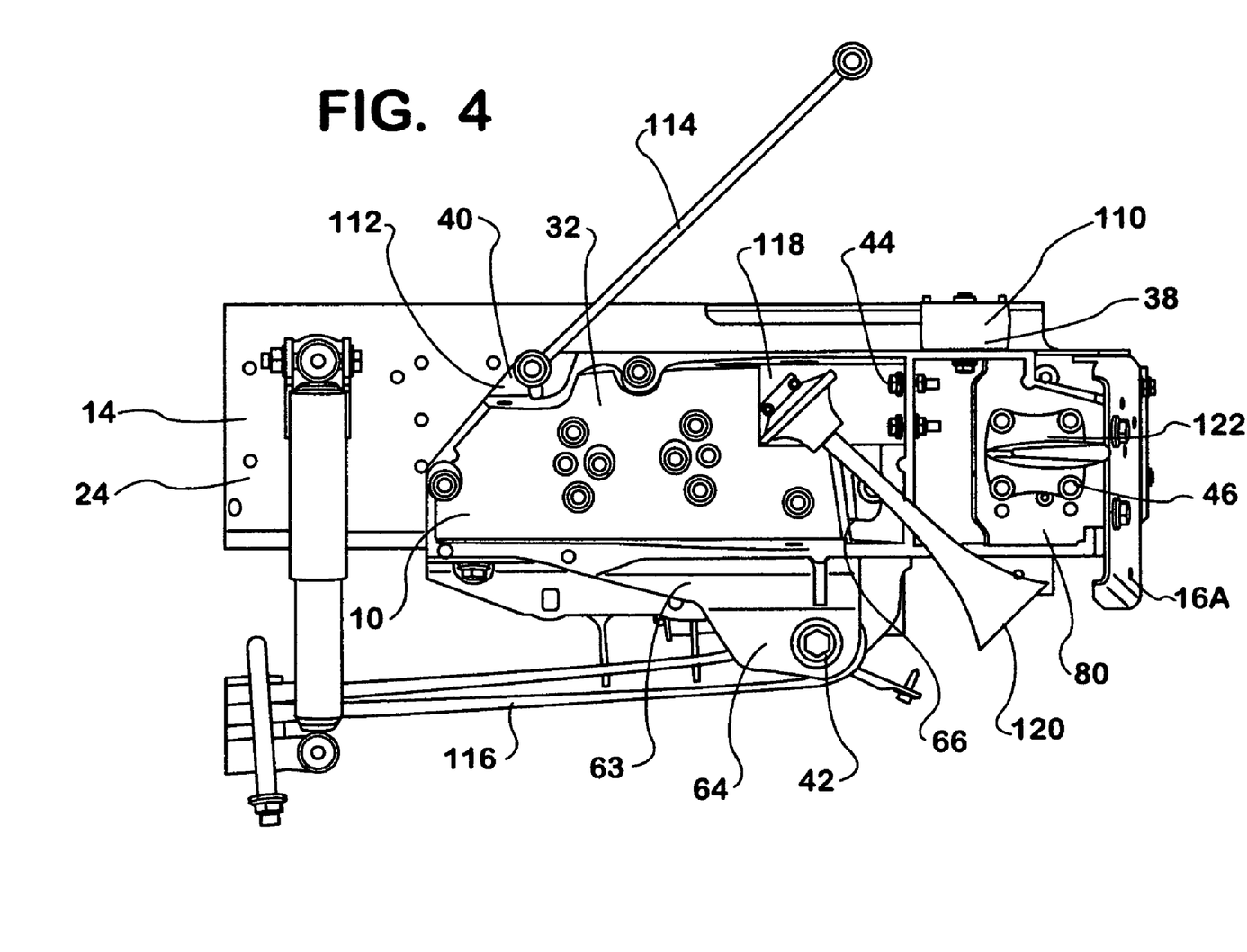
FIG. 4 is left side plan view of the frame extender attached to the frame, the frame extender having vehicle components attached thereto, in accordance with the invention.
Figure 5:
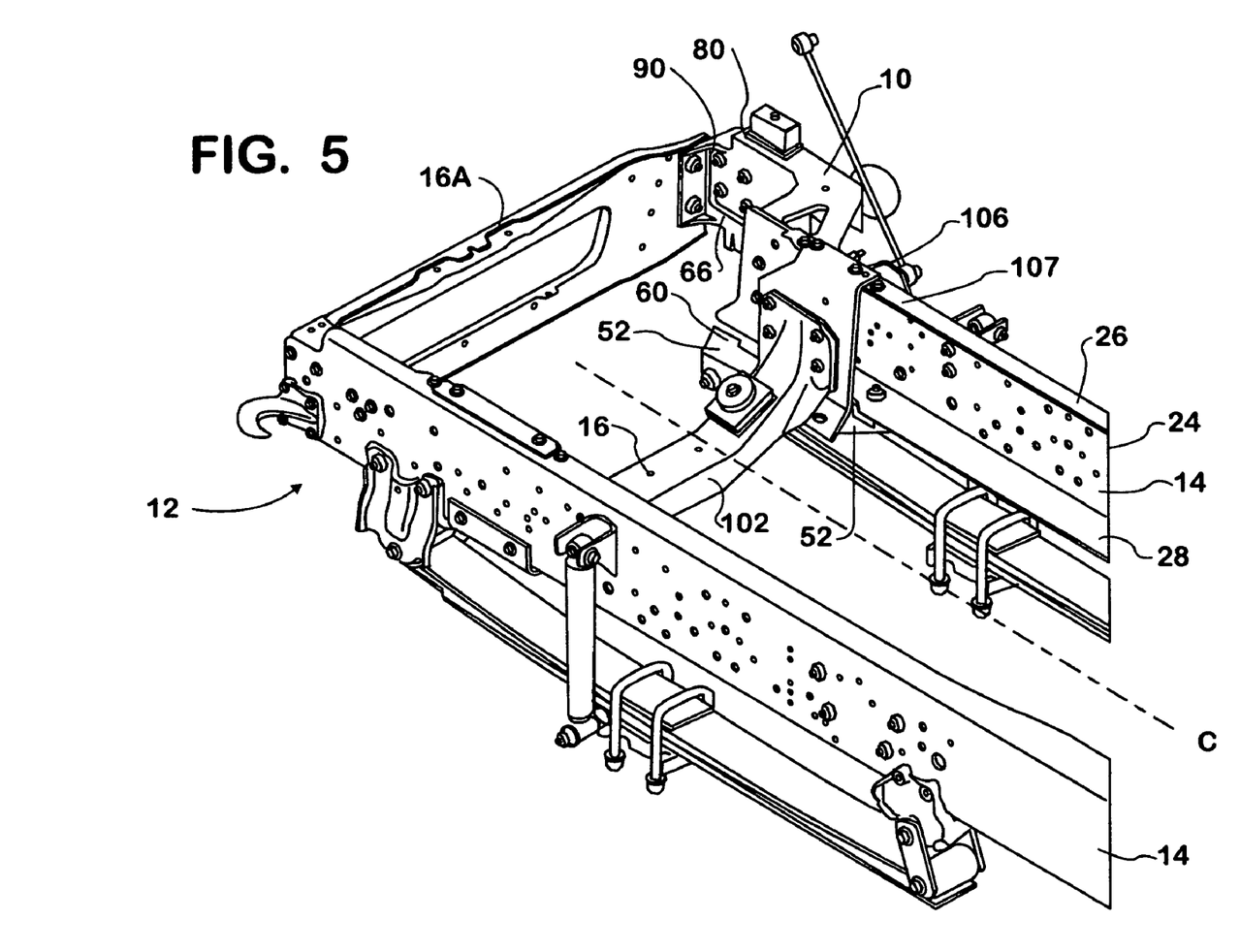
FIG. 5 is a rear perspective view of the frame extender attached to the frame and the front cross member, the frame extender having vehicle components attached thereto, in accordance with the invention.
Figure 6:
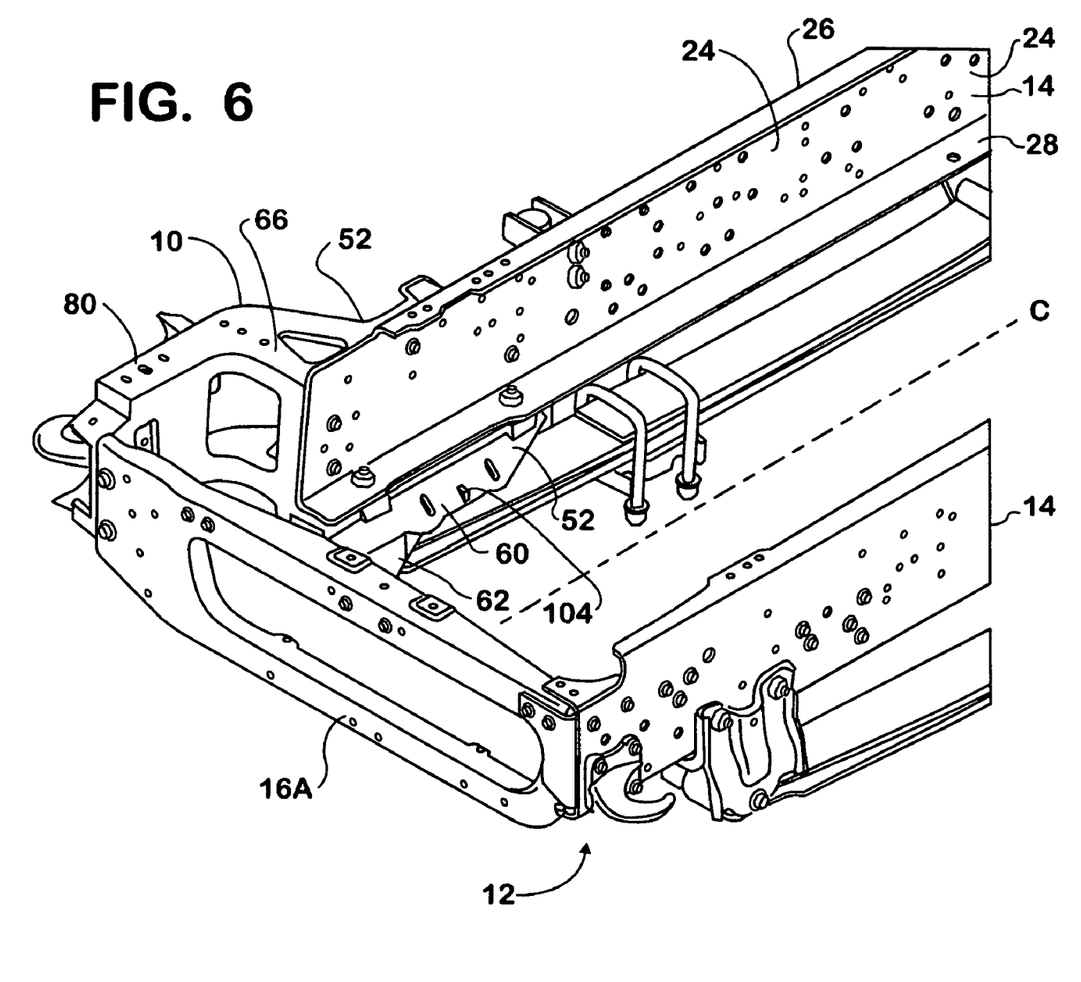
FIG. 6 is a front perspective view of the frame extender attached to the frame and the front cross member, the frame extender having vehicle components attached thereto, in accordance with the invention.

Referring to FIG. 1 through FIG. 3, a frame extender is indicated generally at 10, and is attached to a frame 12 including at two generally parallel siderails 14 and at least one cross member 16. The frame 12 serves as the foundation of a vehicle's body (not shown) and as a place to which various vehicle components are attached. The term vehicle components includes any components on the vehicle, including (but not limited to) vehicle suspension components, fuel tanks, engine, radiator, transmission, muffler, air tanks, splash panels, body, vehicle cab, air horn, fluid reservoirs, etc.

The frame 12 includes two longitudinally extending siderails 14 that are connected to each other with a front cross member 16, and a plurality of subsequent cross members. The cross members 16 provide lateral and torsional rigidity to the frame 12. The front cross member 16A is positioned across the extreme forward ends of the siderails 14.

In addition to the cross members 16, the frame siderails 14 also have attachment structures 20 for the attachment of vehicle components. Typically, the frame siderails 14 are pre-formed with holes or other attachment structures 20, and the vehicle components are positioned against the siderails and mounted into place with fasteners 22, such as bolts. Fasteners 22 are contemplated to mean any mechanical connection, including (but not limited to) bolts, nuts, brackets, etc.

The siderails 14 have a web 24, and a top flange 26 and a bottom flange 28 that extend inwardly toward the centerline "C" of the frame, giving the siderails a general "C"-shape in cross-section. The attachment structure 20 is typically located on both the web 24 and the bottom flange 28.

In many cases, the vehicle components are standardized to have a particular size, shape and configuration, and to have a particular location on the frame 12. However, conflicts in the positioning of the vehicle components with respect to the attachment structures 20 may arise, particularly when a non-standard vehicle component is used.

In contrast to conventional frame extenders, the frame extender 10 is a single component. The frame extender 10 is integrally formed, and advantageously, the frame extender is cast. The frame extender 10 is attached to the frame siderail 14 and to the front cross member 16A to extend the length and the width of the frame 12.

In addition to expanding the footprint of the frame 12, the frame extender 10 also provides attachment structures, including: 1) a splash panel attachment structure 32; 2) a front cross member attachment structure 34; 3) an engine cross member attachment structure 36; 4) a radiator isolator attachment structure 38; 5) a radiator module attachment structure 40; 6) a front spring suspension attachment structure 42; 7) an air horn bracket attachment structure 44; 8) a tow hook attachment structure 46; 9) a washer bottle attachment structure 48; and 10) an extension bracket attachment structure 50, all of which are indicated generally in FIG. 1 and FIG. 2. While the frame extender 10 includes all of the above attachment structures, it is contemplated that less than or more than all of the listed attachment structures may be incorporated, or that different attachment structures may be incorporated.

The frame extender 10 includes a first portion 52 that is configured to be generally parallel to the frame siderail 14. The first portion 52 includes a web 54, a top flange 56, and a bottom flange 58. The top flange 56 extends outwardly, and the bottom flange 58 extends inwardly with respect to the centerline "C" of the frame 12. A front apron 60 extends from the bottom flange 58 generally downwardly and inwardly towards the centerline "C" of the frame 12. The front apron 60 includes a front lip 62 that is generally parallel with the web 54. A rear apron 63 extends rearwardly from the web 54 and includes a rear lip 64.

The first portion 52 also has attachment structure 61, such as holes for receipt of a bolt, to connect the frame extender 10 to the siderail 14. At least a portion of the web 54 is configured to coextend and be generally flush with the web 24 of the siderail 14. Also, at least a portion of the bottom flange 58 is configured to coextend and be generally flush with the bottom flange 28. Advantageously, all of the web 54 and all of the bottom flange 58 coextend with and are generally flush with the siderail 14, however other configurations are contemplated.

The frame extender 10 includes a second portion 66 that is generally perpendicular to the siderail 14. The second portion 66 includes a web 68, a top flange 70 and a bottom flange 72. The web 68 has a web aperture 74, the top flange 70 has a top flange aperture 76, and the bottom flange 72 has a bottom flange aperture 78 to reduce the amount of material and weight of the frame extender 10. The top and bottom flange 70, 72 are outwardly disposed and have a curved contour to buttress the second portion 66 with respect to the first portion 52.

The frame extender 10 includes a third portion 80 that is generally parallel to the first portion 52. The third portion 80 includes a web 82, a top flange 84, a bottom flange 86 and a rib 88. The top and bottom flanges 82, 84 extend outwardly away from the centerline "C", and the rib 88 is disposed on the web 82 between the top and bottom flanges.

The third portion 80 also includes a cross member portion 90 that is generally transverse to the remainder of the third portion. The cross member portion 90 is configured for positioning the front cross member 16A flushly against a web 92 of the cross member portion. The cross member portion 90 also includes a top flange 94 that is curved around a generally 90-degree angle from the remainder of the third portion 80. A recessed portion 96 spans a portion of the web 82 and the web 92.

The splash panel attachment structure 32 is disposed on the second portion 66 at the top flange 70. The splash panel attachment structure 32 includes three holes, however other configurations are contemplated. A splash panel attachment bracket 98 is generally "L"-shaped and is attached to the splash panel attachment structure 32 and to a splash panel 100.

Disposed on the cross member portion 90 of the third portion 80 is the front cross member attachment structure 34. The cross member attachment structure 34 includes two holes configured for receiving a bolt, however other configurations are contemplated. The front cross member 16A is attached to the cross member attachment structure 34 such that the front cross member is generally latitudinal with respect to the longitudinal siderails 14.

Referring to FIG. 1 through FIG. 3 and FIG. 5 through FIG. 6, the engine cross member attachment structure 36 is disposed on the first portion 52 to attach an engine cross member 102. The engine cross member attachment structure 36 is disposed on the front apron 60 and the web 54, and includes a plurality of holes for receiving bolts, however other configurations are contemplated. For example, the engine cross member attachment structure 36 can include a pin 104 (see FIG. 6) on the front apron 60.

On the web 54, the engine cross member attachment structure 36 can include holes to bolt an upper portion 106 of the engine cross member 102 to the siderail 14 and to the web of the frame extender 10. An engine cross member mount 107 can also be attached to the engine cross member 102, the siderail 14 and the frame extender 10. On the front apron 60, the engine cross member attachment structure 36 engages a rim of the engine cross member 102. It is contemplated that the attachment of the engine cross member 102 to the engine cross member attachment structure 36 can vary depending on the drive system, for example whether the vehicle has a 4×2 (FIG. 3), a 6×4 (FIG. 5 and FIG. 6), or any other drive system.

Referring now to FIG. 1 through FIG. 4, the radiator isolator attachment structure 38 is disposed on the top flange 84 of the third portion 80. The radiator isolator attachment structure 38 includes a plurality of holes for receiving bolts, however other configurations are contemplated. A radiator isolator mounting 110 is attached, such as by bolting, to the radiator isolator attachment structure 38.

The radiator module attachment structure 40 is disposed on the first portion 52. Specifically, the radiator module attachment structure 40 is disposed on a recessed surface 112 of the first portion 52, which is recessed from the web 54 (FIG. 1). The radiator module attachment structure 40 includes a hole for receiving a bolt, however other configurations are contemplated. A stay rod 114 is attached to the radiator module attachment structure 40.

The rear lip 64 of the rear apron 63 of the first portion 52 includes the front spring suspension attachment structure 42. The front spring suspension attachment structure 42 includes a hole for receiving a bolt, however other configurations are contemplated. A leaf spring 116 is attached to the front spring suspension attachment structure 42.

The air horn bracket attachment structure 44 is disposed on the web 54 of the first portion 52. An air horn bracket 118 for an air horn 120 is attached to the outward-facing side of the web 54 with a hole for receiving a bolt, however other configurations of air horn bracket attachment structure 44 are contemplated.

At the third portion 80 is the tow hook attachment structure 46. A tow hook 122 is attached opposite the recessed portion 96. Four holes are disposed at the tow hook attachment structure 46 for receiving bolts, however other configurations are contemplated.

Figure 7A:
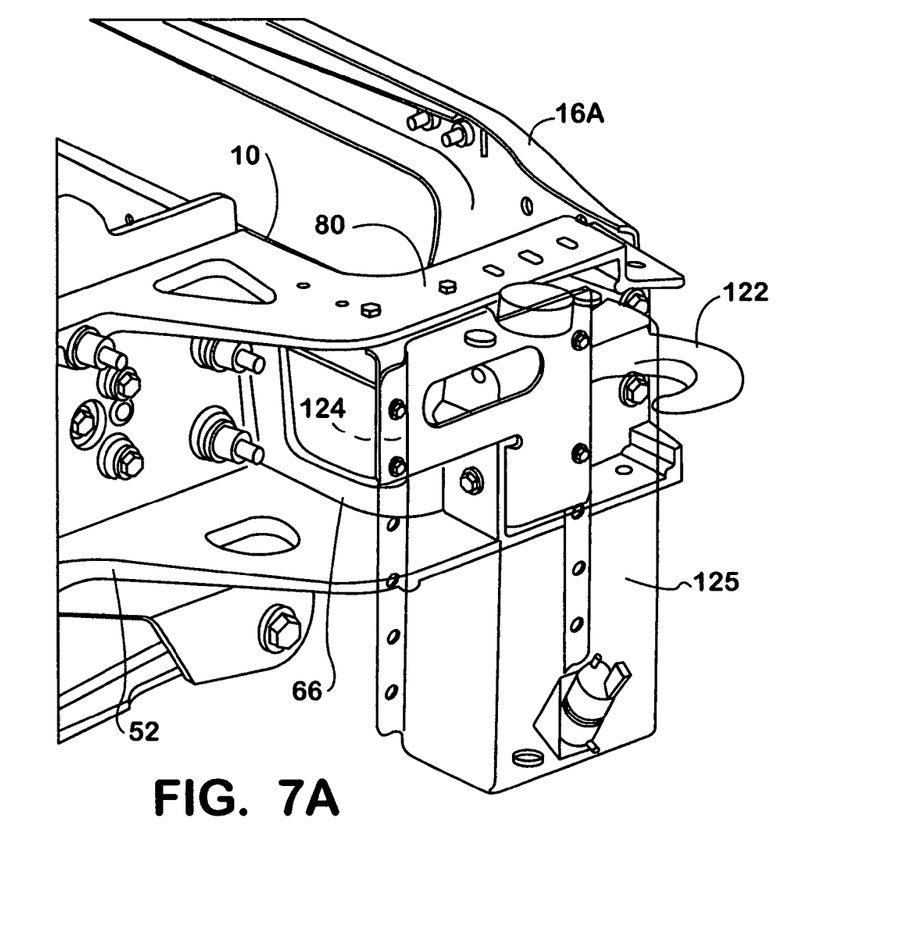
FIG. 7A is a partial rear perspective view of the frame extender attached to the frame and the front cross member, the frame extender having vehicle components attached thereto, in accordance with the invention.
Figure 7B:
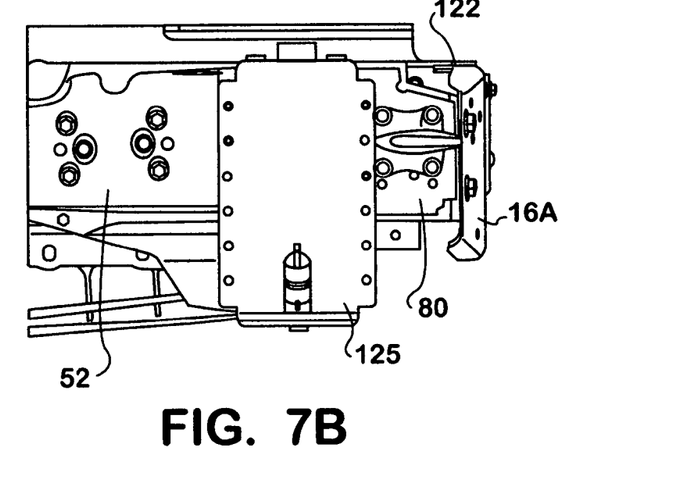
FIG. 7B is a partial left side plan view of the frame extender attached to the frame and the front cross member, the frame extender having vehicle components attached thereto, in accordance with the invention.

Referring now to FIG. 2 and FIG. 7A through FIG. 7B, the washer bottle attachment structure 48 (FIG. 2) is disposed on the third portion 80 of the frame extender 10. Specifically, the washer bottle attachment structure 48 is disposed on the rib 88 and includes at least one hole, however other configurations are contemplated. A washer bottom bracket 124 is attached to the washer bottle attachment structure 48, and a washer top bracket 125 is attached to the washer bottom bracket.

Figure 8A:
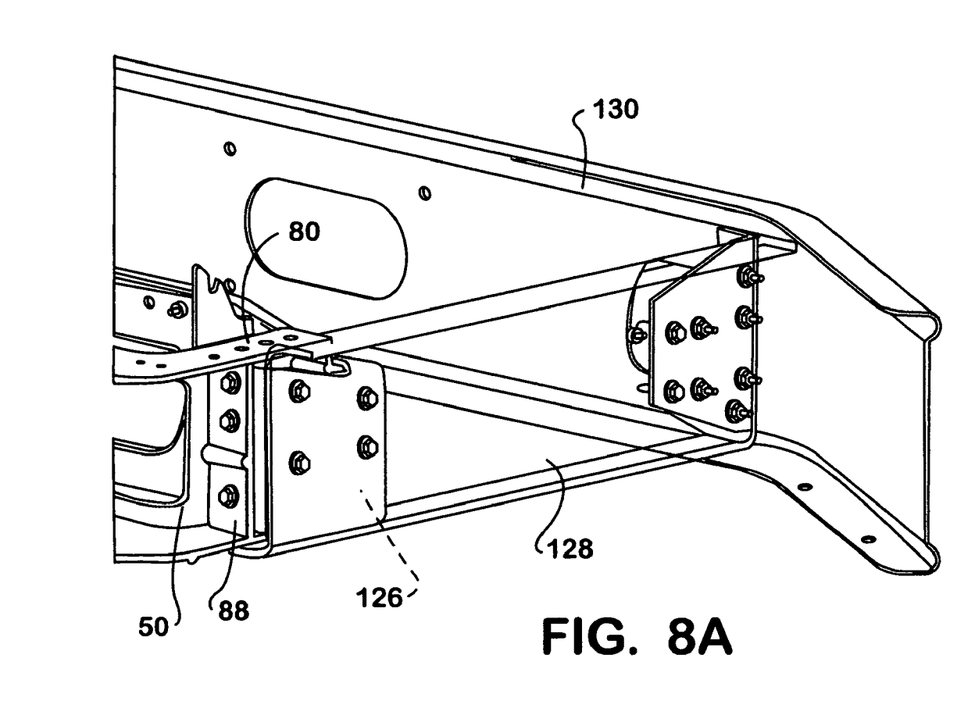
FIG. 8A is a partial rear perspective view of the frame extender having an extension bracket and an extension member in accordance with the invention.
Figure 8B:
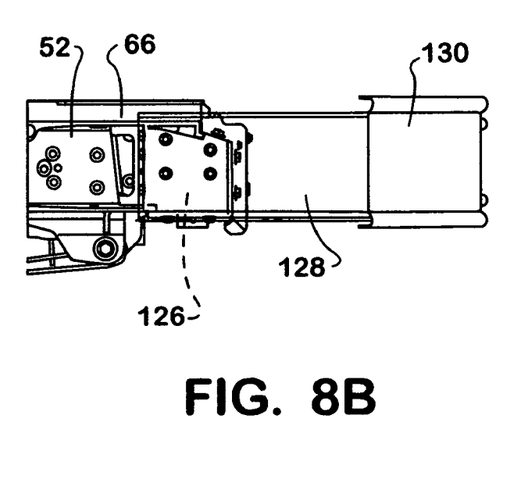
FIG. 8B is a partial left side plan view of the frame extender having the extension bracket and the extension member in accordance with the invention.

Referring to FIG. 1 and FIG. 8A through FIG. 8B, the extension bracket attachment structure 50 (FIG. 2) is disposed on the third portion 80 of the frame extender 10. An extension bracket 126 is attached to the rib 88. The extension bracket attachment structure 50 includes a plurality of holes through the rib 88, however other configurations are contemplated. An extension member 128 is attached to the extension bracket 126 to extend generally parallel to the first portion 52 and to the siderail 14. The extension member 128 is attached to a front bumper 130 in FIG. 8A and FIG. 8B.

While the attachment structures 32-50 have been shown and described, it is contemplated that other attachment structures can be incorporated. For example, the number and placement of the holes can vary. Further, other mechanical attachment structures can be used, for example pins or welding. Additionally, any type of fasteners 22 to be used with the attachment structures are contemplated, including (but not limited to) bolts, nuts, brackets, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A frame extender for attachment to a siderail and to a front cross member of a vehicle frame having a centerline, comprising:
   a first portion generally parallel with and attached to the siderail;
   a second portion extending generally transversely from the first portion and outwardly from the centerline;
   a third portion extending from the second portion and generally parallel to the siderail;
   wherein the first portion, the second portion and the third portion are formed as a single component;
   wherein the first portion, the second portion and the third portion are cast as a single component; and
   wherein the first portion comprises a top flange, a bottom flange, and a web disposed between the top flange and the bottom flange.

2. The frame extender of claim 1 wherein the top flange extends outwardly from the centerline of the frame and the bottom flange extends inwardly towards the centerline of the frame.

3. The frame extender of claim 1 wherein the second portion comprises a top flange, a bottom flange, and a web disposed between the top and the bottom flange, wherein the top and bottom flange are outwardly disposed with respect to the centerline of the frame.

4. The frame extender of claim 1 wherein the third portion comprises a top flange, a bottom flange, and a web disposed between the top and the bottom flange, wherein the top and the bottom flanges extend outwardly away from the centerline of the frame.

5. The frame extender of claim 4 wherein the third portion further comprises a rib disposed on the web and extending between the top and the bottom flanges outwardly away from the centerline of the frame.

6. The frame extender of claim 4 wherein the third portion further comprises a cross member portion configured for engaging the front cross member across a web of the cross member portion.

7. The frame extender of claim 1 further comprising at least one of:
   a splash panel attachment structure disposed on the second portion;
   a front cross member attachment structure disposed the third portion;
   an engine cross member attachment structure on the first portion;
   a radiator isolator attachment structure disposed on the third portion;
   a radiator module attachment structure disposed on the first portion;
   a front spring suspension attachment structure disposed on the first portion;
   an air horn bracket attachment structure disposed on the first portion;
   a tow hook attachment structure disposed on the third portion;
   a washer bottle attachment structure disposed on the third portion; and
   an extension bracket attachment structure disposed on the third portion.

8. The frame extender of claim 1 further comprising:
   a splash panel attachment structure disposed on the second portion;
   a front cross member attachment structure disposed the third portion;
   an engine cross member attachment structure on the first portion;
   a radiator isolator attachment structure disposed on the third portion;
   a radiator module attachment structure disposed on the first portion;
   a front spring suspension attachment structure disposed on the first portion;
   an air horn bracket attachment structure disposed on the first portion;
   a tow hook attachment structure disposed on the third portion;
   a washer bottle attachment structure disposed on the third portion; and
   an extension bracket attachment structure disposed on the third portion.

9. A frame extender for attachment to a siderail and to a front cross member of a vehicle frame having a centerline, comprising:

a first portion generally parallel with and attached to the siderail, the first portion having a web, a bottom flange and a front apron, wherein the front apron extends downwardly;

an engine cross member attachment structure on the web and on the apron of the first portion, the engine cross member attachment structure configured to be attached to an engine cross member.

10. The frame extender of claim 9, further comprising a front spring suspension attachment structure disposed on a rear apron of the first portion.

11. The frame extender of claim 9 further comprising a radiator module attachment structure disposed on a recessed portion of the first portion.

12. The frame extender of claim 9 further comprising a second portion extending generally transversely from the first portion and outwardly from the centerline.

13. The frame extender of claim 12 further comprising a splash panel attachment structure disposed on a top flange of the second portion.

14. The frame extender of claim 12 further comprising a third portion extending from the second portion and generally parallel to the siderail.

15. The frame extender of claim 14 further comprising a front cross member attachment structure disposed on the third portion.

16. The frame extender of claim 14 further comprising a radiator isolator attachment structure disposed on the third portion.

17. The frame extender of claim 14 further comprising an extension bracket attachment structure disposed on the third portion.

18. A frame extender for attachment to a siderail and to a front cross member of a vehicle frame, comprising:

a first portion generally parallel with and attached to the siderail, wherein the first portion comprises a top flange, a bottom flange, and a web disposed between the top flange and the bottom flange, wherein the top flange extends outwardly from the centerline of the frame and the bottom flange extends inwardly towards the centerline of the frame;

a second portion extending generally transversely from the first portion and outwardly from the centerline, wherein the second portion comprises a top flange, a bottom flange, and a web disposed between the top and the bottom flange, wherein the top and bottom flanges are outwardly disposed with respect to the centerline of the frame;

a third portion extending from the second portion and generally parallel to the siderail wherein the third portion comprises a top flange, a bottom flange, and a web disposed between the top flange and the bottom flange, wherein the top and the bottom flanges extend outwardly away from the centerline of the frame;

wherein the first portion, the second portion and the third portion are formed as a single component.

* * * * *